United States Patent

Dean

[11] Patent Number: 5,818,904
[45] Date of Patent: Oct. 6, 1998

[54] COLLABORATIVE TRUNK TESTING METHOD AND SYSTEM

[75] Inventor: Matthew T. Dean, Campbell, Calif.

[73] Assignee: Siemens Business Communication Systems, Inc., Santa Clara, Calif.

[21] Appl. No.: 729,258

[22] Filed: Oct. 9, 1996

[51] Int. Cl.[6] .............................. H04M 1/24; H04M 3/08; H04M 3/22
[52] U.S. Cl. .................................... 379/22; 379/1; 379/5; 379/12; 379/27; 379/31
[58] Field of Search .................................... 379/1, 2, 5, 8, 379/9–10, 12, 14, 15, 16, 22–23, 25–26, 32, 34, 343, 377, 27, 31; 370/242, 244

[56] References Cited

U.S. PATENT DOCUMENTS

| | | | |
|---|---|---|---|
| 4,759,049 | 7/1988 | Mangini | 379/22 |
| 4,794,632 | 12/1988 | Burton et al. | 379/22 |
| 5,425,075 | 6/1995 | Selden et al. | 379/10 |

*Primary Examiner*—Curtis A. Kuntz
*Assistant Examiner*—Binh K. Tieu

[57] ABSTRACT

A method and connectivity evaluation system for testing trunk lines dedicated by a centralized telecommunications system to a customer switching system, such as a PBX, includes allowing the trunk-seizing capability of the telecommunications system to be remotely accessed from the premises of the customer switching system. The dedicated trunk lines can be sequentially isolated in response to the remote access of the trunk-seizing capability. Isolated trunk lines can be used to transmit test signals to opposite end equipment for evaluating characteristics of the signal. The test signals can be generated from either or both of the central office of the telecommunications system and the premises of the customer switching system, but in the preferred embodiment, all such transmissions are controlled from the customer switching system. In another embodiment, the transmissions are controlled from the central office.

14 Claims, 3 Drawing Sheets

COLLABORATIVE TRUNK TESTING METHOD AND SYSTEM

BACKGROUND OF THE INVENTION

The invention relates generally to methods and systems for maintaining telecommunications connectivity, and more particularly to methods and systems for testing trunks which connect a private branch exchange to a centralized telecommunications system.

DESCRIPTION OF THE RELATED ART

Customer switching systems are used to support a number of telephone stations located at premises of a particular customer of telecommunications services. For example, a business entity may utilize a private branch exchange (PBX) to connect telephones of employees of the business entity. The PBX provides local connectivity of the on-premises telephone stations.

Connectivity of the PBX-supported telephone stations to remote telephones requires a centralized telecommunications system, such as a public switched telephone network (PSTN). The telephony customer leases or otherwise obtains rights to trunk lines which are dedicated to the customer. For example, Direct Inward Dial (DID) trunks allow incoming calls to be placed directly on a trunk line without use of an operator. A PBX may require hundreds of DID trunks. For each incoming call to a PBX, the particular DID trunk to be utilized is determined at the central office of the PSTN. The concern is that the inoperability of a trunk will remain undetected by the PBX user, since the PBX does not participate in the trunk-selection process. Unless it is determined that connectivity resources of the PBX are being prematurely exhausted for a given level of call traffic, numerous inoperable trunks may remain undetected, so that the customer is leasing trunks to which it does not have access.

One solution is to conduct tests of the trunks dedicated to the PBX. However, tests at the PBX end are limited, since it is the central office that has the capability to select particular DID trunks. As a result, DID trunk testing typically is controlled at the central office. The test procedure may be labor-intensive, such as requiring a person at each end of the trunk under test. The test procedure may be limited, such as selecting a trunk on a hit-and-miss basis in which the selection includes a significant degree of randomness. However, the preferred test procedure includes the capability at the central office to specify a trunk which is to be tested. This capability will be referred to herein as a "Direct Trunk Select" (DTS) capability at the central office. Known DTS facilities typically are executed in computer software and/or hardware, with the ability to systematically isolate one or more trunks. Nevertheless, the actual testing requires a significant degree of coordination between personnel of the PBX and the central office.

When a connectivity malfunction is detected, an issue is the assignment of the responsibility for the costs of detection and repair. The central office is responsible for maintenance of a first portion of the telecommunications resources, while either the PBX user or the manufacturer of the PBX equipment is responsible for a second portion. U.S. Pat. No. 4,794,632 to Burton et al. refers to a demarcation point near the PBX at which the trunk lines are connected to lines to the PBX. The telephone company has responsibility only for the trunk lines between the demarcation point and the central office, with the PBX user or manufacturer having responsibility for any lines or equipment on the PBX side of the demarcation point. The Burton et al. approach to testing is to locate the test equipment at the demarcation point. This allows the test equipment to selectively isolate the lines that extend to the PBX. If malfunctions are detected along these lines, the PBX equipment is determined to be the source of difficulties. The test equipment may also be programmed to test trunk lines. The circuitry can respond to a command in the form of a dual tone multiple frequency (DTMF) signal provided from a far end of a control trunk after a trunk line is isolated from the PBX and connected for testing.

Another approach is described in U.S. Pat. No. 5,425,075 to Selden et al., which is assigned to the assignee of the present invention. Two double-pole-double-throw relays are connected to a telephony system to distinguish between defective telephone company trunk lines and defective equipment of the system. The switches connect a given trunk interface with a given trunk line when in a first mode, and connect the given trunk interface with an alternative trunk line when in a second mode. By comparing the qualities of service in the two modes, sources of defects can be identified. The relays are independently and remotely controlled. The test equipment provides multiple remote testing capabilities, including the ability to remotely test the telephony system utilizing "trunk rolling." The patent describes trunk rolling as a commonly employed troubleshooting technique to isolate voice channel problems between the PBX equipment and the central office trunk lines by physically interchanging two trunk lines, one of which is a known good channel. If the quality-of-service problem is present when the known good channel is connected, the defect is within the PBX equipment. On the other hand, if the problem is eliminated when the known good channel is connected, the defect is within the second trunk line of the central office.

While Burton et al. and Selden et al. operate well for intended purposes, the approaches are limited in their testing capacity, unless service personnel at the central office either control the procedure or cooperate with the testing personnel. In either situation, the procedure is costly and labor intensive.

What is needed is a method and system for testing trunks dedicated to a customer switching system, such as a PBX, that permit a wide range of tests from the premises of the system without significantly increasing the expense of the system.

SUMMARY OF THE INVENTION

A method of selectively testing trunk lines dedicated to a customer switching system includes remotely accessing trunk-seizing capability of a centralized telecommunications system from the premises of the customer switching system. That is, rather than requiring redundant switching capability to allow normal operation and testing operation, the trunk-seizing capability of the centralized system is controlled at the customer switching level. One of the trunks dedicated to the customer switching system is isolated in response to the remote access from premises of the customer switching system. The isolation defines a trunk line under test. Test signals are then transmitted to test equipment via the trunk line under test.

In the preferred embodiment, the remote access of the trunk-seizing capability includes remotely initiating execution of a Direct Trunk Select (DTS) feature of the centralized telecommunications system. The DTS feature is accessible in the same manner that Direct Inward System Access (DISA) allows a user of a PBX to access features of the PBX from an outside telephone number. Typically, the trunk-seizing capability of the centralized telecommunications system is implemented in computer software at a central office. The method and system allow manipulation of the computer software processing from the premises of the customer switching station.

In one embodiment, the test equipment is located at the central office of the centralized telecommunications system. Because the trunk is seized, test signals and patterns may be unrelated to leased number ranges and features of a PBX.

In the system embodiment of the invention, the connectivity evaluation includes components that provide collaboration between a PBX and a central office of the telecommunications system. DTS software and/or circuitry is located at the central office for systematically and sequentially isolating individual trunks. A Direct Inward Access (DIA) circuit located at the PBX end remotely accesses the DTS feature of the central office, such that the trunk isolation is remotely manipulated from the PBX. Test equipment at one or both of the PBX and central office is used to receive and evaluate test signals and patterns transmitted via an isolated trunk.

In another embodiment, the remote access and control is switched, so that the central office is responsible for defining a sequence of isolated trunks under test and for manipulating test signal generation from the PBX to the central office. In the same manner as the other embodiments, the testing takes place in a collaborative manner that preferably occurs without including personnel at the opposed ends of the trunk under test.

DETAILED DESCRIPTION

Figure 1:
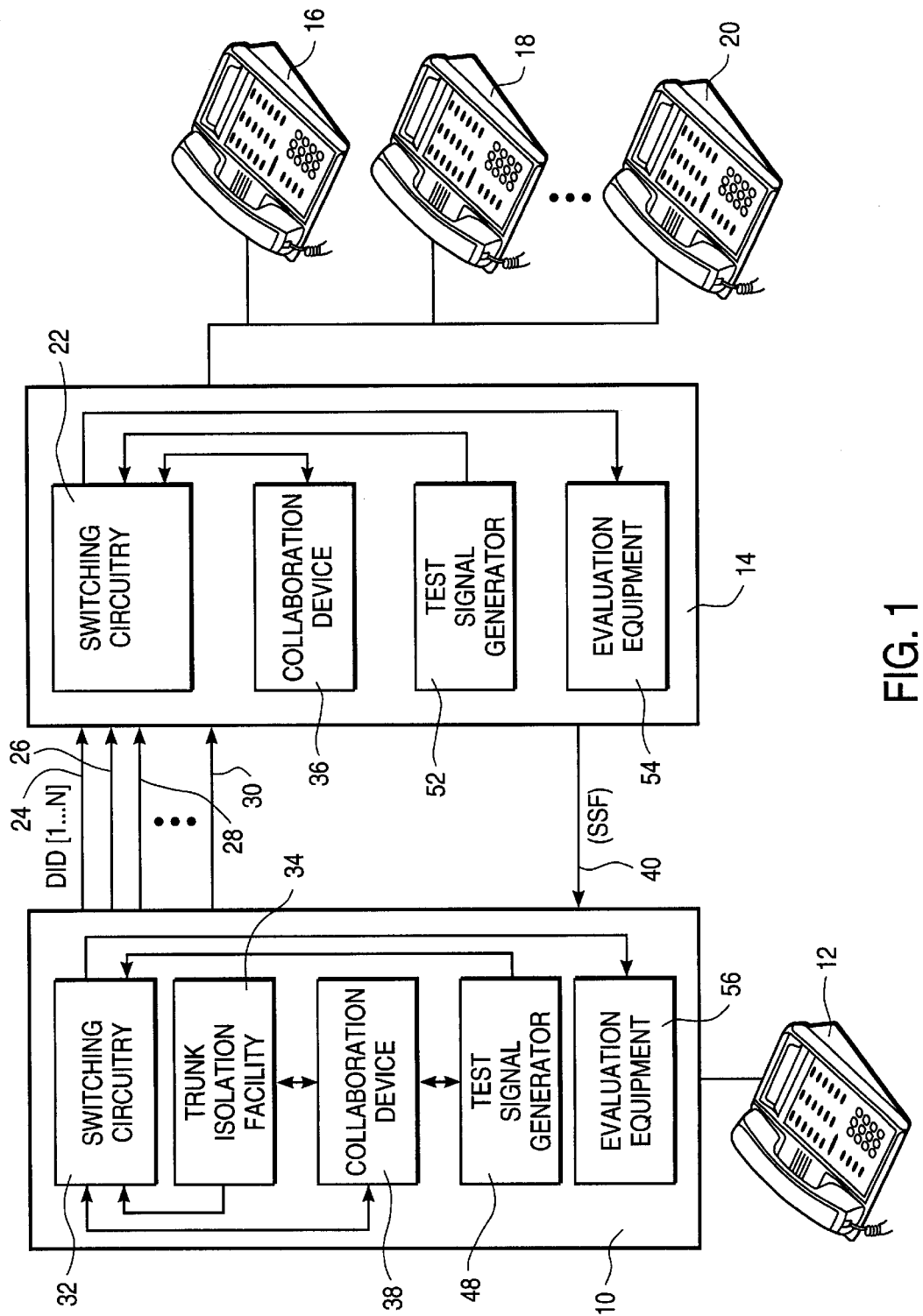
FIG. 1 is a block diagram of a collaborative trunk testing system in accordance with one embodiment of the invention.

With reference to FIG. 1, a central office 10 of a telecommunications system supports individual telephones 12 and customer switching systems, such as a PBX 14. In turn, the PBX supports a number of local telephone stations 16, 18 and 20. The telephone stations are shown as only including feature phones, but may also include personal computers or other devices that allow one or more forms of multimedia communication over both wired and non-wired communication paths.

The PBX 14 includes switching circuitry 22 for controlling telecommunications connections of the PBX-supported telephones 16, 18 and 20. That is, the switching circuitry is the call routing equipment of the communications between two or more PBX-supported telephones. However, an incoming or outgoing call that involves a remote telephone 12 requires routing through the central office 10. A number of Direct Inward Dial (DID) trunk lines 24, 26, 28 and 30 are shown in FIG. 1 and may be used by the central office to route incoming calls to the PBX without the need of an operator. Switching circuitry 32 within the central office 10 determines which DID trunk line is utilized for a particular incoming call to the PBX 14. In most situations, the PBX is unaware of the specific trunk line that is selected for a call. As previously noted, this approach leaves the PBX susceptible to being in a situation in which leased trunk lines are unavailable for use without knowledge of the inaccessibility by the owners/users of the PBX system.

The invention allows automated and/or on-demand testing of the DID trunk lines 24–30 from the premises of the PBX 14. In the preferred embodiment, the testing is a collaborative scheme that does not require involvement of service personnel at the central office 10. In the more preferred embodiment, the collaborative scheme does not require service personnel at either end of the trunk lines 24–30. For example, the testing may occur as periodic preventive maintenance, with human involvement only if defects are discovered. An advantage of the invention is that the diagnosis and isolation of DID-related problems occur remotely and without the costly coordination and personnel requirements. This translates directly into cost savings for service providers for either or both of the PBX 14 and the central office 10.

The automated and/or on-demand testing procedure is controlled remotely from the premises of the PBX equipment 14. Because the selection of DID trunk lines 24–30 occurs unilaterally at the central office 10, the testing procedure must be a collaborative effort. As shown in FIG. 1, the central office includes a trunk isolation facility 34. This trunk isolation facility provides a trunk-seizing capability that is known in the art. Typically, the trunk-seizing capability is implemented in computer software. However, this is not critical. The facility may also be implemented in hard circuitry. The presence of a trunk isolation facility 34 allows an individual DID trunk to be isolated for testing or for other purposes.

Figure 2:
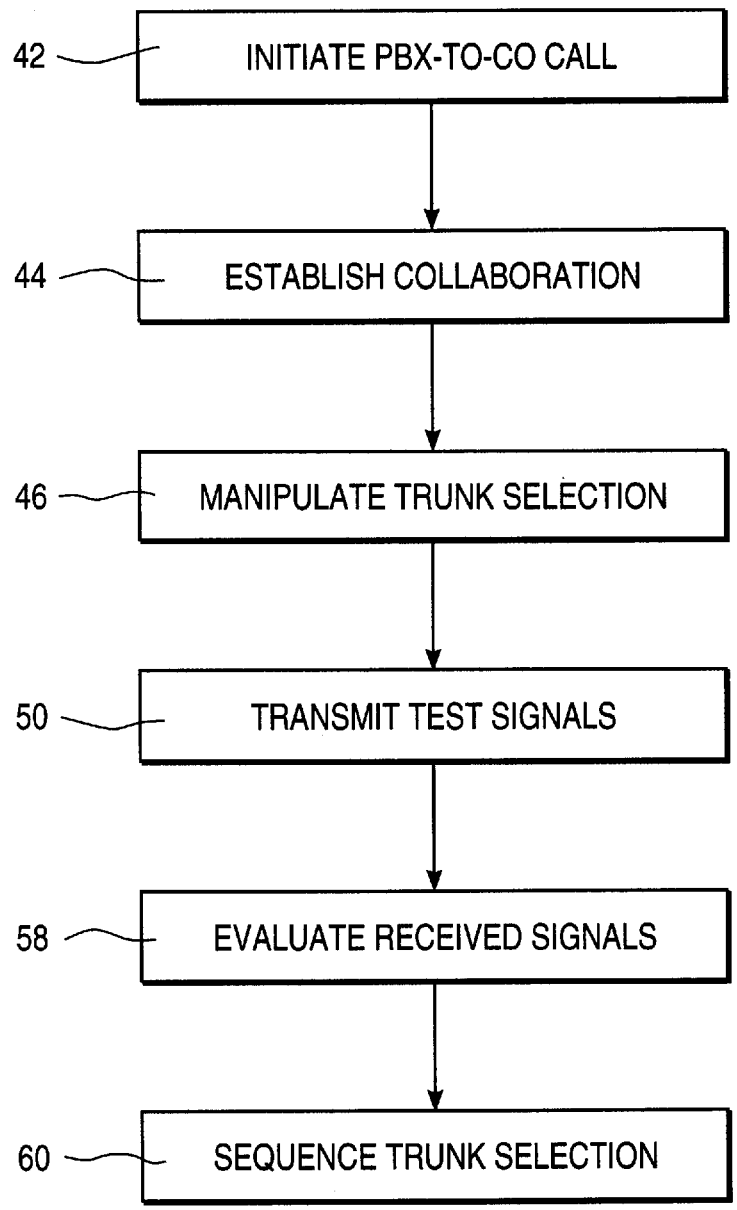
FIG. 2 is a process flow diagram of one embodiment of a method for testing trunk lines dedicated to a customer switching system.

After a DID trunk line 24–30 has been selected, a call is placed to a specific trunk test port on the PBX. Then, test signals or test patterns may be transmitted over the isolated trunk line in order to evaluate the performance of the line. As shown in FIG. 1, the PBX 14 includes a collaborative device 36. This device provides coordination with a collaborative device 38 to allow remote manipulation of the trunk-seizing process. While not critical, the communication between the two collaborative devices 36 and 38 may be initiated via an outgoing call to the central office 10 over a conventional Setup and Signaling Facility (SSF) 40. Referring now to FIG. 2, the step 42 of initiating the call begins the procedure. The collaborative device 36 of the PBX 14 is utilized in this step. In step 44, collaboration with the device 38 of the central office 10 is established. However, this step is not critical. That is, the trunk isolation facility 34 of the central office may be manipulated without the use of the collaborative device 38. In the preferred embodiment, the "collaborative" approach is similar to the known Direct Inward System Access (DISA) features of a PBX. As is well known in the art, DISA allows a person located at a compatible remote telephone, such as telephone 12, to utilize all or some of the features of the PBX that are normally reserved for PBX-supported telephones 16–20. That is, DISA allows a remote user to "manipulate" the capabilities of the PBX. The remote manipulation of the trunk-seizing capacity of the central office 10 from the PBX 14 may be executed using similar techniques, so that the manipulation may be considered a Direct Inward Access (DIA) feature of the invention. This access will typically require an authorization procedure, such as use of a password. However, the authorization may be implemented in computer software, so that the entire test procedure is fully automated.

The cooperation between the two collaborative devices 36 and 38 is then used to initiate the transmission of test signals and test patterns. If the test signals and patterns are to be transmitted from the central office 10 to the PBX 14, the transmission is preferably controlled from the premises of the PBX, in the same manner as the remote direction to seize a trunk for testing purposes. Specific test signals and patterns can be transmitted by the central office based upon control signals received from the PBX via the SSF 40.

As shown in FIG. 1, the central office 10 includes a test signal generator 48. In step 50 of FIG. 2, the test signals and/or patterns are transmitted via the DID trunk line 24–30 under test. This is only one embodiment of the invention. In a second embodiment, a test signal generator 52 at the PBX 14 is used to transmit the test signals and patterns to the central office. In this embodiment, the test signal generator 48 of the central office would not be required. In a third embodiment, the transmission of the test signals and patterns is by means of a loopback circuit that includes the trunk line 24–30 under test, as well as a second line. For example, the SSF 40 may be used to transmit the test signals to the central office 10, which then directs the test signals back to the PBX via the trunk line under test. This loopback embodiment may also be implemented by sending and receiving the test signals at the central office 10. In a fourth embodiment, the test signals are transmitted bidirectionally, so that both of the test signal generators 48 and 52 are required. The transmissions may be synchronized. In this fourth embodiment, the performance of the trunk line under test may be evaluated with respect to both receiving signals at the PBX and sending signals from the PBX.

The embodiment of FIG. 1 includes evaluation equipment 54 and 56 at both the PBX 14 and the central office 10. Received test signals and patterns are conducted to the evaluation equipment at the receiving site. The circuitry of the evaluation equipment depends upon the signals and/or patterns that are used in the testing. An advantage of the invention is that because the DID trunk 24–30 is seized and connected to the PBX test number/port prior to transmission of the test signals, any digits that are pulsed over the DID circuit are not constrained to the DID number range that is dedicated to the PBX 14. That is, since the trunk line under test is fully seized, the trunk line may function as a pipeline that is insensitive to transmitted signals. For example, in one testing embodiment, the signaling is not limited to DTMF tones.

Referring again to FIG. 2, the characteristics of the received signals are evaluated at step 58 to determine the level of performance of the trunk line under test. The testing may include a silent monitoring evaluation in which the level of noise on the line is quantified. A milliwatt test can be employed in order to evaluate the minimum level of signal strength required for intelligible communication. In addition or in the alternative, a wide range of frequencies may be transmitted and then evaluated at the receiving site in order to ensure that the trunk line 24–30 has a relatively flat frequency response across its required bandwidth.

In step 60, each of the trunk lines 24–30 is tested in sequence. Parallel testing is contemplated, but not critical. The isolation of the individual DID trunks may be executed as a "hard down" in which an ongoing call session is terminated, or may be a "courtesy down" in which a busy status signal is sent by the central office 10 to the PBX 14 over the SSF 40. As previously noted, the testing procedure of FIG. 2 is preferably executed without human intervention. Any defective trunk lines are reported during or following the test procedure.

Figure 3:
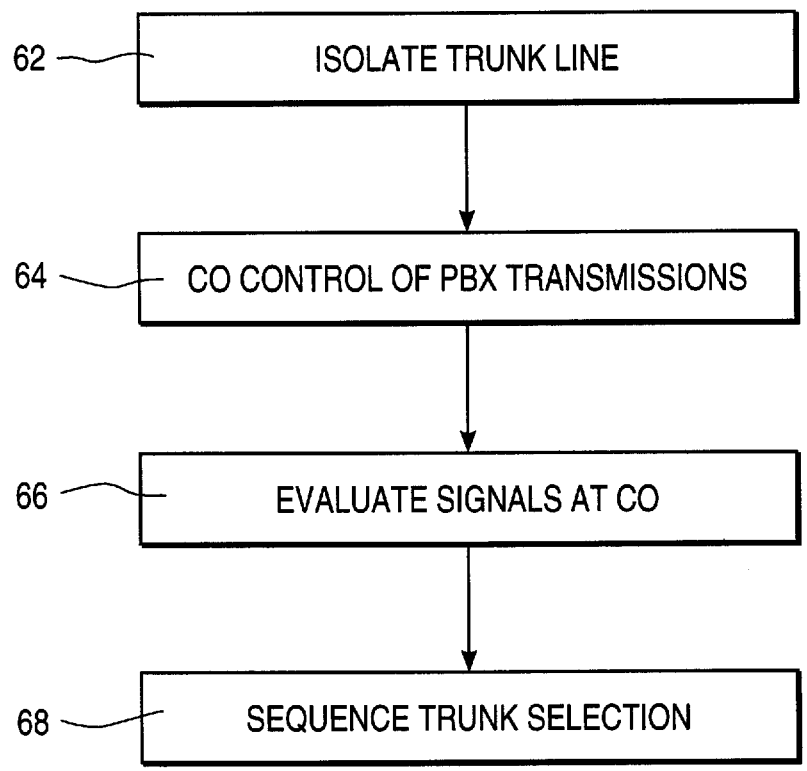
FIG. 3 is a process flow diagram of a second embodiment of a method for testing dedicated trunk lines.

Referring now to FIG. 3, a second embodiment of the method is shown. In a step 62, one of the trunk lines 24–30 of FIG. 1 is isolated. Preferably, the isolation is manipulated from the PBX 14 in the manner described above, but this is not critical. After the trunk line under test is defined, the central office controls the transmission of test signals from the generator 52 of the PBX. This is shown at step 64 in FIG. 3. Thus, the site at which test signal transmissions are controlled is reversed relative to the embodiment of FIG. 2. The test signals and/or patterns may have a predefined format, or the central office may specifically identify which signals are to be sent.

In step 66, the test signals from the PBX 14 are received at the central office 10 and the characteristics of the signals are evaluated in order to quantify the level of performance of the trunk line under test. Of course, if no signals are received, it is determined that the trunk line under test is inoperable. Finally, in step 68, the trunk selection is sequenced until all of the trunk lines 24–30 of FIG. 1 are tested.

I claim:

1. A method for selectively testing a plurality of dedicated trunk lines assigned by a centralized telecommunications system to a customer switching system comprising steps of:

remotely accessing trunk-seizing capability including the ability to individually isolate each of said plurality of dedicated trunk lines to be tested;

specifying a particular one of said dedicated trunk lines via said remote access from said premises;

isolating said particular one of said dedicated trunk lines in response to specifying said particular dedicated trunk line via said remote access from said premises of said customer switching system, thereby defining a trunk line under test utilizing said trunk-seizing capability of said centralized telecommunications system; and transmitting test signals to test equipment via said trunk line under test.

2. The method of claim 1 wherein said step of remotely accessing said trunk-seizing capability includes remotely initiating execution of a Direct Trunk Select (DTS) feature of said centralized telecommunications system.

3. The method of claim 2 wherein said step of remotely accessing said trunk-seizing capability includes manipulating computer program processing of said centralized telecommunications system from said customer switching system.

4. The method of claim 1 further comprising steps of evaluating performance of said trunk line under test utilizing said test equipment and sequentially isolating each of said plurality of dedicated trunk lines on a one-by-one basis, including controlling said isolation sequence of said dedicated trunk lines via remotely accessing said trunk-seizing capability from said premises of said customer switching system.

5. The method of claim 1 wherein said step of transmitting test signals includes generating a test signal pattern at a first one of said centralized telecommunications system and said premises of said customer switching system, said test equipment being located at a second one of said centralized telecommunications system and said premises.

6. The method of claim 1 wherein said step of transmitting test signals includes generating a test signal pattern at said premises of said customer switching system and includes receiving said test signal pattern at said premises via a loopback telecommunications connection, said test equipment being located at said premises, said customer switching system being a private branch exchange (PBX).

7. The method of claim 6 wherein said steps of accessing said trunk-seizing capability and isolating said one dedicated trunk line include forming a master-slave relationship such that said PBX controls computer program processing of said centralized telecommunications system.

8. The method of claim 1 further comprising a step of evaluating performance of said isolated dedicated trunk line using said test equipment, including measuring signal magnitudes upon receiving said test signals.

9. The method of claim 1 wherein said step of transmitting test signals includes sending said test signals bidirectionally, with each of said centralized telecommunications system and said premises of said customer switching system having test equipment for evaluating received test signals.

10. The method of claim 1 wherein said step of remotely accessing said trunk-seizing capability includes calling said centralized telecommunications system using a Setup and Signaling Facility (SSF).

11. A connectivity evaluation system for collaboration testing comprising:

a private branch exchange (PBX) for supporting a plurality of local telephone stations;

a central office for supporting said PBX to allow communications with remote telephone stations;

a plurality of Direct Inward Dial (DID) trunks dedicated to connecting said PBX to said central office;

a Direct Trunk Select (DTS) means located at said central office for systematically and sequentially isolating individual DID trunks;

a Direct Inward Access (DIA) means located at said PBX for remotely accessing said DTS means of said central office to designate a selected DID trunk for testing, said DTS means being responsive to said DIA means to accommodate remote manipulation of said capability of systematically and sequentially isolating individual DID trunks; and test means located in at least one of said PBX and said central office for evaluating characteristics of signals transmitted via said selected DID trunk isolated by said DTS means.

12. The system of claim 11 further comprising signal means for generating test signals selected to facilitate connectivity between said PBX and said central office, said signal means being selectively connected to said individual DID trunk at an input end, with said test means being connected to an output end of said individual DID trunk.

13. The system of claim 12 wherein each of said PBX and said central office includes said test means and said signal means.

14. The system of claim 12 wherein said test means is located at said PBX and wherein said signal means is located at said central office, both of said test means and said DTS means being remotely controlled by said DIA means of said PBX.

* * * * *